United States Patent Office 2,965,650
Patented Dec. 20, 1960

2,965,650

KETO-SUBSTITUTED DITHIACYCLOPARAFFINS OF 7 TO 9 ANNULAR ATOMS AND THEIR PREPARATION

Edward G. Howard, Jr., Hockessin, Del., assignor to E. I. du Pont de Nemours and Company, Wilmington, Del., a corporation of Delaware No Drawing. Filed June 8, 1955, Ser. No. 514,107

20 Claims. (Cl. 260—327)

This invention relates to a new class of chemical compounds and to their preparation. More particularly this invention relates to new functionally substituted dithiacycloparaffins containing from seven to nine members in the ring and to methods for their preparation.

It is known [Ber. 32, 1389 (1899); Meadow and Reid, J. Am. Chem. Soc. 56, 2170–80 (1934)] that when alpha, omega-dithiols are reacted with alpha, omega-dibromoalkanes in the presence of a base there are obtained the corresponding dithiacycloparaffins. In this way, there have been prepared 1,4-dithiacycloheptane, 1,5-dithiacyclooctane, and 1,6-dithiacyclononane. However, no dithiacycloparaffins of this type have heretofore been known containing keto oxygen directly bonded to an annular carbon atom.

It is an object of this invention to provide a new class of chemical compounds and a method for their preparation. A further object is to provide a new family of functionally-substituted dithiacycloparaffins and a process for their preparation. A still further object is to provide a new class of sulfur-containing cyclic ketones and a method for their preparation. Other objects will appear hereinafter.

These and other objects of this invention are accomplished by providing new keto-substituted dithiacycloparaffins having a ring of seven to nine members of which two are annular sulfur atoms and the remainder are annular carbon atoms, the keto oxygen being directly attached to an annular carbon atom which is separated from each annular sulfur atom by at least one annular carbon atom, and the annular sulfur atoms being separated from each other by at least two annular carbon atoms. The remaining valences of the annular carbon atoms can be satisfied by hydrogen, hydrocarbon radicals or hydroxyhydrocarbon radicals.

The new keto-substituted dithiacycloparaffins of this invention are sulfur-containing cyclic ketones having as their basic structure a 7 to 9 membered keto-dithiaccycloparaffin nucleus, the keto oxygen atom being directly attached to an annular carbon atom, whose two remaining valences are directly attached to annular carbon atoms, and the two sulfur atoms are separated by at least two carbon atoms, the remaining valences of the ring carbon atoms being satisfied by hydrogen or a radical RX, where R is hydrocarbon and X is hydrogen or hydroxyl. Preferred compounds are those wherein the sulfur atoms are in positions 1 and 4 of the keto-substituted dithiacycloheptanes, in positions 1 and 5 of the keto-substituted dithiacyclooctanes and in positions 1 and 6 of the keto-dithiacyclononanes and the two ring carbons which are adjacent to the carbonyl group, i.e., the annular carbon bearing keto oxygen, have attached thereto from one to two hydrogen atoms. The hydrogens on these ring carbons which are adjacent to the carbonyl group show active methylene-carbon reactivities. These compounds are therefore polyfunctional in nature, being ketones and active methylene compounds.

It has now been found that this new class of chemical compounds, the keto-substituted dithiacycloparaffins, are obtained when a dihaloketone is condensed with a dithiol. In one method for preparing these new keto-substituted dithiacycloparaffins, an alkali metal is dissolved in a volatile aliphatic monohydric alcohol, e.g., methanol. To this solution there is then added a dithiol, such as an alkane dithiol, containing the thiol groups on vicinal carbons or on carbons which are separated by from 1 to 2 carbon atoms, e.g., 1,2-ethanedithiol, 1,3-propanedithiol and 1,4-butanedithiol, in an amount corresponding to one-half mole thereof per mole of metal alkoxide. A second solution is prepared by dissolving a dihalo-substituted ketone, e.g., sym.-dichloroacetone, in an inert solvent, e.g., diethyl ether.

The two solutions, prepared as above, are added simultaneously and at essentially the same rate to a reactor fitted with dropping funnels, thermometer, and stirrer, containing an agitated volatile reaction medium. Throughout the mixing of the solutions the temperature is maintained below 50° C. by cooling. After reaction is complete the reaction mixture is poured onto an ice, water, diethyl ether mixture containing an alkali metal hydroxide in solution. The mixture is then extracted with diethyl ether, the extracts combined, and subjected to distillation to remove the solvent and isolate the keto-substituted dithiacycloparaffin as the desired reaction product.

The examples which follow are submitted to illustrate and not to limit this invention.

EXAMPLE I

A 1-liter, 2-necked flask was fitted with a magnetic stirrer, condenser, and thermometer. A methanol solution of 0.2 mole of sodium methoxide was prepared in the flask by adding 4.6 g. (0.2 g. atom) of sodium to 300 ml. of absolute methanol. The stirred mixture was cooled to 5° C. and 200 ml. of absolute diethyl ether, containing 9.4 g. (0.1 mole) of 1,2-ethanedithiol, was added. A solution of 12.7 g. (0.1 mole) of sym.-dichloroacetone in 100 ml. of diethyl ether was added over a period of 5 hours, keeping the temperature at 0° to 5° C. After one hour at 10° C., the mixture was neutralized with aqueous hydrochloric acid and poured into water. The product, 6-keto-1,4-dithiacycloheptane, was isolated by extraction with diethyl ether, drying the extract with anhydrous magnesium sulfate, and distilling.

| Fraction | B.P. ° C. at 0.13 mm. | $n_D^{25}$ | Wgt./g. |
|---|---|---|---|
| 1 | 53–66 | 1.5904 | 0.8 |
| 2 | 66–66.8 | 1.5915 | 5.1 |
| 3 | 66 | 1.5915 | 1.5 |

Fraction 2 analyzed as follows:

*Analysis.*—Calc'd for $C_5H_8S_2O$: C, 40.51; H, 5.44; S, 43.26; M.W., 148. Found: C, 40.78; H, 5.44; S, 43.17; M.W., 158, 161.

The 6-keto-1,4-dithiacycloheptane, a colorless liquid freezing at 13.5° to 14° C. was slightly soluble in water. The aqueous solution gave a typical ketone test with an acid solution of 2,4-dinitrophenylhydrazine. The absence of mercaptan groups was indicated by the lack of reaction with iodine reagent and by insolubility of the compound in aqueous alkali. Nuclear magnetic resonance measurements showed that the compound had only two kinds of hydrogen and that it was symmetrical.

The presence of the keto group and of active methylene groups was demonstrated by the following experiments:

One gram of the 6-keto-1,4-dithiacycloheptane was suspended in a few milliliters of dry ethylene glycol and dry hydrogen chloride gas was added. There was a sharp temperature increase and in a minute or so a mass of crystalline solid formed. This solid, 1,4-dioxa-7,10-dithiaspiro[4.6]-hendecane, melted at 101° C. after recrystallization from ethyl alcohol.

*Analysis.*—Calc'd for $C_7H_{12}S_2O_2$: C, 43.72; H, 6.29; S, 33.34. Found: C, 44.03, 44.34; H, 6.34, 6.60; S, 33.62.

Through a mixture of the 6-keto-1,4-dithiacycloheptane and 1,2-ethanedithiol there was passed dry hydrogen chloride. A few milliliters of benzene was added and very slowly a white solid formed. After the benzene had evaporated, a pasty solid resulted which was pressed dry between filter paper and recrystallized from benzene to give 1,4,7,10-tetrathiaspiro[4.6]-hendecane, M.P. 140°–142° C.

*Analysis.*—Calc'd for $C_7H_{12}S_4$: C, 37.46; H, 5.49; S, 57.28. Found: C, 37.80; H, 5.39; S, 56.88.

A solution of 2.98 g. (0.02 mole) of p-dimethylaminobenzaldehyde, 1.48 g. (0.01 mole) of 6-keto-1,4-dithiacycloheptane and one drop of piperidine in 15 ml. of absolute methyl alcohol was prepared at room temperature and stored for one week. There resulted 2.5 g. of a bright yellow solid which melted at 129.5–130.5° C. after recrystallization from ethyl alcohol.

*Analysis.*—Calc'd for $C_{14}H_{17}S_2NO$: N, 5.01; S, 22.97. Found: N, 5.04, 4.97; S, 23.05; $\epsilon$ 259m$\mu$=9,200; $\epsilon$ 414m$\mu$—27,940.

To a solution of 2.12 g. (0.02 mole) of benzaldehyde and 1.48 g. (0.01 mole) of 6-keto-1,4-dithiacycloheptane in 10 ml. of absolute ethyl alcohol was added four drops of piperidine. After five days standing at room temperature 3.0 g. of yellow solid was collected, M.P. 118–119° C. after recrystallization from ethyl alcohol.

*Analysis.*—Calc'd for $C_{19}H_{16}S_2O$: C, 70.33; H, 4.97; S, 19.76. Found: C, 69.16, 69.19, 69.31; H, 5.12, 4.96, 5.05; S, 19.41; $\epsilon$ 300m$\mu$=22,400; $\epsilon$ 365m$\mu$=7,800.

EXAMPLE II

Fifty-five and three-tenths grams (2.4 g. atoms) of sodium were dissolved in 700 ml. of absolute methanol in a 1-liter volumetric flask to which a condenser had been attached. To this solution there was added, with agitation, 113 g. (1.2 moles) of 1,2-ethanedithiol and enough methanol to bring the volume to one liter.

In a 1-liter volumetric flask there was placed 152 g. (1.2 moles) of sym.-dichloroacetone and 600 ml. of diethyl ether. After solution was complete the volume was made up to one liter with diethyl ether.

The above solutions were added simultaneously and at the same rate to 250 ml. each of methyl alcohol and diethyl ether contained in a 3-necked flask fitted with two dropping funnels, a magnetic stirrer, thermometer, and cooling bath. The reaction vessel and the 1,2-ethanedithiol solution were blanketed with oxygen-free nitrogen. The solutions were added at a rate of 100 ml. each for the first hour, 150 ml. each for the second hour, and the remainder at 250 ml. each per hour. The temperature of the reaction was maintained at 10° C. The reaction mixture was poured into an ice, water, ether mixture containing 50 ml. of 10% sodium hydroxide, and extracted with ether three times. The small amount of polymer that resulted was removed by decantation. This procedure was carried out three times and the combined extracts distilled after removal of the ether by distillation.

| Fraction | B.P. °C./mm. | $n_D^{25}$ | Wgt./g. |
|---|---|---|---|
| 1 | 82–85/0.35 | | |
| 2 | 85–89/0.28 | 1.5920 | 118.5 |
| 3 | 89–90/0.28 | 1.5925 | 133.2 |
| 4 | 95–97/0.33 | 1.5924 | 114.7 |

The yield of 6-keto-1,4-dithiacycloheptane, based on fractions 2, 3, and 4, is 366.4 g. or 69.8% of theory. A short Vigreaux column was used in this distillation and fraction 4 was distilled more rapidly than the preceding fractions, which probably explains the higher boiling point observed.

The 6-keto-1,4-dithiacycloheptane was converted to the disulfone as follows:

To a solution of 4.44 g. (0.03 mole) of the 6-keto-1,4-dithiacycloheptane in 25 ml. acetic acid there was added dropwise 13.8 g. (0.12 mole) of aqueous 30% $H_2O_2$, keeping the temperature below 34° C. The white solid which formed slowly was collected after standing five days. There resulted 4.8 g. of the disulfone of 6-keto-1,4-dithiacycloheptane, M.P. 279–282° C. (dec.), after recrystallization from water.

*Analysis.*—Calc'd for $C_5H_8S_2O_5$: C, 28.30; H, 3.80; S, 30.21. Found: C, 28.20; H, 3.77; S, 30.66.

The 6-keto-1,4-dithiacycloheptane is converted to the sulfoxide as follows:

To a solution of 4.44 g. (0.03 mole) of 6-keto-1,4-dithiacycloheptane in 25 ml. of acetic acid was added 6.9 g. (0.06 mole) of 30% $H_2O_2$ in water, keeping the temperature below 34° C. After standing five days at room temperature, ether was added to the clear solution. This caused the precipitation of 3.0 g. of the disulfoxide of 6-keto-1,4-dithiacycloheptane, M.P. 177–181° C. (dec.) after recrystallization from ethanol.

*Analysis.*—Calc'd for $C_5H_8S_2O_3$: C, 33.32; H, 4.47; S, 35.58. Found: C, 33.30; H, 4.50; S, 35.45.

EXAMPLE III

A methanol solution of sodium methoxide was prepared by adding 9.2 g. of sodium to 170 ml. of methanol. To this solution there was added 21.6 g. (0.2 mole) of 1,3-propanedithiol and the volume of the mixture was adjusted to 250 ml. by addition of methanol. A second solution was prepared by dissolving 25.4 g. (0.2 mole) of sym.-dichloroacetone in enough diethyl ether to produce 250 ml. of solution.

The above solutions were blanketed with nitrogen and added simultaneously and at the same rate to a flask fitted with a stirrer and containing 100 ml. each of methanol and diethyl ether, while maintaining the temperature of the reaction mixture at 10°±2° C. A white precipitate began to form immediately. The mixing of the solutions required four hours. After removal of solid polymer and sodium chloride by filtration, the mother liquors were washed with water containing sodium hydroxide. The aqueous part was extracted twice with ether and the extracts were combined with the original organic layer. After being dried over anhydrous magnesium sulfate, the mixture was distilled and the following fractions separated:

| Fraction | B.P. °C./mm. | $n_D^{40}$ | Wgt./g. |
|---|---|---|---|
| 1 | 78–89/0.50 | | 1.0 |
| 2 | 89–90/0.35 | | 3.2 |
| 3 | 90–92/0.35 | 1.5813 | 6.9 |

Fractions 2 and 3 were solids melting at about 41–42° C. A sample of fraction 3 was recrystallized from absolute ethyl alcohol, M.P. 46–47° C. The yield of 7-keto-1,5-dithiacyclooctane based on fractions 2 and 3 was 10.1 g. or 31.2% of theory.

*Analysis.*—Calc'd for $C_6H_{10}S_2O$: C, 44.41; H, 6.21; S, 39.52; M.W., 162. Found: C, 44.61; H, 6.20; S, 39.65; M.W., 161, 163.

EXAMPLE IV

Following the procedure of Example III, using 25.4 g. (0.2 mole) of sym.-dichloroacetone and 24.4 g. (0.2 mole) of 1,4-butanedithiol and ethanol as the reaction medium, impure ketone was isolated by removing the polymer and distilling the filtrate. There was obtained 4 g. of oil boiling at 93–100° C./0.30 mm. It was treated with ethylene glycol and dry hydrogen chloride to give a sticky solid which was purified by two recrystallizations from absolute ethyl alcohol, giving 1.1 g. of 1,4-dioxa-7,12-dithiaspiro[4.8]-tridecane (the ethylene glycol acetal of 3-keto-1,5-dithiacyclononane), M.P. 136.5–138° C.

*Analysis.*—Calc'd for $C_9H_{16}S_2O_2$: C, 49.06; H, 7.32; S, M.W., 220.

The ketone, 3-keto-1,5-dithiacyclononane, is obtained from the acetal by heating with water at a pH of less than 7.

EXAMPLE V

A solution was prepared by adding 12.7 g. (0.1 mole) of sym.-dichloroacetone to water and making up to 250 ml.

To a solution of 8.0 g. (0.2 mole) of sodium hydroxide in 200 ml. of water there was added 9.4 g. (0.1 mole) of 1,2-ethanedithiol. The mixture was agitated under a nitrogen atmosphere until solution was complete. The volume of the solution was then adjusted to 250 ml. with water.

The two solutions, prepared as described above, were added simultaneously and at the same rate to a 1-liter flask fitted with two dropping funnels, nitrogen inlet tube, thermometer, and stirrer, and containing 300 ml. of water. The addition was carried out under a nitrogen atmosphere at 25°–27° C. with stirring and required two hours. After standing 30 minutes more, the reaction mixture was made basic with aqueous sodium hydroxide and extracted with ether. The extract was dried over anhydrous magnesium sulfate and distilled. The product, 6-keto-1,4-dithiacycloheptane, boiled at 81–83° C. under 0.29–0.10 mm. of mercury and weighed 8.5 g. (58.5% of theory), $n_D^{25}$, 1.5929.

The new keto-substituted dithiacycloparaffins of this invention are sulfur containing cyclic ketones having as their basic structure the keto-dithiacycloparaffin nucleus. These keto-substituted dithiacycloparaffins can be represented by the structural formula

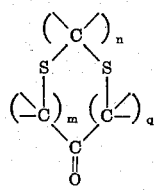

wherein $n$ is an integer from 2 to 4 and $m$ and $q$ are integers from 1 to 2 and the sum of $n$, $m$ and $q$ is 4 to 6. The free valences of the annular carbon atoms are satisfied by hydrogen, hydrocarbon radicals, such as alkyl radicals, particularly of up to 14 carbon atoms, aryl radicals such as phenyl, hydroxyhydrocarbon radicals, such as hydroxyalkyl, particularly hydroxy lower alkyl radicals of 1 to 5 carbon atoms, and two of the annular carbon atoms separating the annular sulfur atoms can be hydrocarbon radicals which are joined together to form with the ring carbons to which they are attached a 6-membered saturated or conjugated unsaturated carbocyclic ring. Generally, not more than one or two of the annular carbons contain substituents. The preferred compounds have at least one hydrogen atom attached to each of the annular carbon atoms adjacent to the annular carbon atom bearing keto oxygen.

In the above examples 1,2-ethanedithiol, 1,3-propanedithiol, and 1,4-butanedithiol have been used. It is to be understood that in their place and as full equivalents thereof there may be used any dithiol in which the thiol groups are attached either to vicinal carbons or to carbons which are separated by from on to two carbon atoms, i.e., the thiol groups are separated by two to four carbon atoms, such as an alkylene radical of 2 to 4 carbons. Generally the dithiols are hydrocarbon other than the thiol groups and are of not more than 16 carbon atoms. Specific examples are 1,2- and 1,3-propanedithiols, 1-phenyl-1,2-dimercaptoethane, 1,2- and 1,3-n-octanedithiol, 1,2-, 1,3- and 1,4-butanedithiols, 1,2- and 1,4-n-hexadecanedithiol, 2,3-butanedithiol, 1,2-cyclohexanedithiol, 1,2-benzenedithiol, 1,2-dimercaptopropanol-3, 1,3-dimercaptopentanol-5, and the like.

When the above dithiols are used in place of the 1,2-ethanedithiol of Example I in the process of Example I with sym.-dichloroacetone there are obtained the keto-substituted-1,4-dithiacycloparaffins listed in Table I below:

Table I

| Dithiol | Product |
| --- | --- |
| 1,2-Propanedithiol | 2-Methyl - 6 - keto - 1,4 - dithiacycloheptane. |
| 1 - Phenyl - 1,2 - dimercaptoethane. | 2 - Phenyl - 6 - keto - 1,4 - dithiacycloheptane. |
| 1,2-n-Octanedithiol | 2 - n - Hexyl - 6 - keto - 1,4 - dithiacycloheptane. |
| 1,2-Butanedithiol | 2 - Ethyl - 6 - keto - 1,4 - dithiacycloheptane. |
| 1,2-n-Hexadecanedithiol | 2 - n - Tetradecyl - 6 - keto - 1,4 - dithiacycloheptane. |
| 1,4-n-Hexadecanedithiol | 6 - Dodecyl - 3 - keto - 1,5 - dithiacyclononane. |
| 1,3-n-Octanedithiol | 2 - Pentyl - 7 - keto - 1,5 - dithiacyclooctane. |
| 1,3-Dimercaptopentanol-5 | 2 - Hydroxyethyl - 7 - keto - 1,5 - dithiacyclooctane. |
| 2,3-Butanedithiol | 6 - Keto - 2,3 - dimethyl - 1,4 - dithiacycloheptane. |
| 1,2-Cyclohexanedithiol | 4 - Keto - 2,6 - dithiabicyclo[5.4.0]-hendecane. |
| 1,2-Benzenedithiol | 4 - Keto - 2,6 - dithiabicyclo[5.4.0]-7,9, 11-hendecetriene. |
| 1,2-Dimercaptopropanol-3 | 2 - Hydroxymethyl - 6 - keto -1,4- dithiacycloheptane. |

The dihalo-substituted ketones used in preparing the keto-dithiacycloparaffins of this invention are those containing an acyclic chain of 3 to 5 carbon atoms, the carbonyl group on the 2 or 3 position, the halogens on the 1,3; 1,4; 1,5; 2,4; or 2,5 positions, and the valences of the acyclic carbons joined to the carbonyl group are satisfied by hydrogens or by monovalent hydrocarbon or hydroxyhydrocarbon gorups, such as alkyl or hydroxyalkyl of 1 to 5 carbons, aryl and cycloalkyl. Thus alpha, alpha'-, beta, beta'-, alpha, beta'- and alpha, gamma'-dihaloketones can be used. The two halogens of the dihaloketone are separated from each other by an acyclic chain of 3 to 5 carbon atoms including the keto carbon atom. Generally these dihaloketones are entirely hydrocarbon except for the keto oxygen and halogen, and contain no more than 16 carbon atoms. Examples are 1,3-dichloro-2-butanone, 2,4-dichloro-3-pentanone, 1,3-diphenyl-1,3-dibromo-2-propanone, 1,4-dibromo-2-butanone, 1,5-dichloro-3-pentanone, and the like. When these dihalo-substituted ketones are used in place of sym.-dichloroacetone in Example I in the process of Example I, with 1,2-ethanedithiol, the products tabulated in Table II below are obtained.

Table II

| Dihalo-substituted Ketone | Product |
| --- | --- |
| 1,3-Dichloro-2-butanone | 5 - Methyl - 6 - keto - 1,4 - dithiacycloheptane. |
| 2,4-Dichloro-3-pentanone | 5,7 - Dimethyl - 6 - keto - 1,4 - dithiacycloheptane. |
| 1,3 - Diphenyl - 1,3 - dibromo - 2 - propanone. | 5,7 - Diphenyl - 6 - keto - 1,4 - dithiacycloheptane. |
| 1,4-Dibromo-2-butanone | 7 - Keto - 1,4 - dithiacyclooctane. |
| 1,5-Dichloro-3-pentanone | 7 - Keto - 1,4 - dithiacyclononane. |

In preparing the keto-substituted dithiacycloparaffins of this invention, the condensation may be effected at temperatures from —10° to 50° C. and at ordinary pressures under alkaline conditions, i.e., a pH above 7. Because of the susceptibility of the dithiols to oxidation, it is desirable that their conversion to the alkali metal salt as well as their reaction with the dihaloketone be carried out in an inert atmosphere.

The new keto-substituted dithiacycloparaffins of this invention are prepared by reacting an alkali metal salt of the dithiol dissolved in an aliphatic monohydric alcohol or water with the dihaloketone dissolved in an inert solvent at a temperature below 50° C. In a convenient way of operating, a solution of alkali metal salt of the dithiol in a volatile aliphatic monohydric alcohol is added to a reactor provided with cooling and agitating means, simultaneously and at essentially the same rate as a solution of the dihaloketone in an inert organic solvent, and under conditions providing for maintaining the temperature below room temperature (ca. 25° C.). The dithiol and dihaloketone are employed in essentially chemically equivalent proportions. If desired, however, a slight excess of one or the other reactants may be used.

In the examples the sodium salt of the dithiol has been used. This is because of availability and relative low cost of sodium as compared to the other alkali metals. If desired, however, the potassium or lithium salts may be used instead but this has no advantage but rather raises costs.

In place of methanol there may be used other aliphatic monohydric alcohols or water. Methanol and water have practical advantages of cost and are the preferred reaction media. In place of methanol there may be used other aliphatic monohydric alcohols, e.g., ethanol, propanol, and the like.

In place of diethyl ether there may be used other volatile organic media which are unreactive with the dihaloketone. Examples are water, dipropyl ether, dioxane, benzene, isooctane, and the like.

The amount of reaction medium is not critical and is determined solely by practical considerations. As a rule there is no advantage in using more than 400 times the combined weight of the dithiol and dihaloketone, and this constitutes a practical upper limit.

The new keto-substituted dithiacycloparaffins of this invention are useful as rancidity inhibitors for vegetable oils, as illustrated below with 6-keto-1,4-dithiacycloheptane.

A 50% benzene solution of a commercially available cotton seed oil was divided into two 2-gram portions. One portion was used as a control (no added agent) and to the other portion there was added 0.01 g. of 6-keto-1,4-dithiacycloheptane, prepared as in Example I. Separate pieces of filter paper were dipped into each of the solutions, blotted to remove excess solution, and dried in air at room temperature until all the benzene had evaporated (approximately 15 minutes). The weight of oil on the filter paper was about 0.25 g. in each case. The filter papers were placed in separate wide-mouth, screw-top glass bottles, kept at 65° C., and examined daily for development of rancidity. The control developed rancidity in 11 days and the sample containing the 6-keto-1,4-dithiacycloheptane showed no rancidity development even after 34 days under the same conditions.

Reference is made to my copending application Serial No. 452,460, filed August 26, 1954, now U.S. Patent 2,790,811, granted April 30, 1957, which discloses and claims 5-oxo-1,3-dithianes.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A keto-substituted dithiacycloparaffin of seven to nine annular atoms having the formula

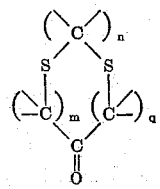

wherein $n$ is an integer of at least 2 and not greater than 4, $m$ and $q$ are integers from 1 to 2 with the proviso that $m$ and $q$ are each the integer 1 when $n$ is greater than 2, from one to two of the free valences of the annular carbon atoms are satisfied by members selected from the class consisting of hydrogen, alkyl radicals of up to 14 carbon atoms, phenyl, and monohydroxyalkyl radicals of up to 5 carbon atoms, and the remaining free valences of the annular carbon atoms are satisfied by hydrogen.

2. A keto-substituted dithiacycloparaffin of seven to nine annular atoms having the formula

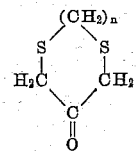

wherein $n$ is an integer of at least 2 and not greater than 4.

3. 3-keto-1,5-dithiacyclononane.

4. A keto-substituted dithiacycloparaffin of seven to nine annular atoms having the formula

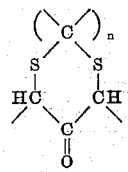

wherein $n$ is an integer of at least 2 and not greater than 4, a free valence of one of the annular carbon atoms is satisfied by an alkyl radical of up to 14 carbon atoms and the remaining free valences of the annular carbon atoms are satisfied by hydrogen.

5. An alkyl-substituted 6-keto-1,4-dithiacycloheptane having the formula

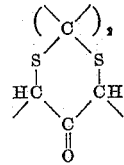

wherein a free valence of one of the annular carbon atoms is satisfied by an alkyl radical of up to 14 carbon atoms, and the remaining free valences of the annular carbon atoms are satisfied by hydrogen.

6. 2-methyl-6-keto-1,4-dithiacycloheptane.

7. A keto-substituted dithiacycloparaffin of seven to nine annular atoms having the formula

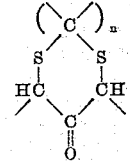

wherein $n$ is an integer of at least 2 and not greater than 4, a free valence of one of the annular carbon atoms is satisfied by a monohydroxyalkyl radical of up to 5 carbon atoms, and the remaining free valences of the annular carbon atoms are satisfied by hydrogen.

8. A hydroxyalkyl-substituted 6-keto-1,4-dithiacycloheptane having the formula

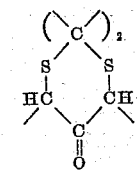

wherein a free valence of one of the annular carbon atoms is satisfied by a monohydroxylalkyl radical of up to 5 carbon atoms, and the remaining free valences of the annular carbon atoms are satisfied by hydrogen.

9. 2-hydroxymethyl-6-keto-1,4-dithiacycloheptane.
10. 6-keto-1,4-dithiacycloheptane.
11. 7-keto-1,5-dithiacyclooctane.
12. Process for preparing 7-keto-1,5-dithiacyclooctane which comprises mixing and reacting, at a temperature below 50° C., sym.-dichloroacetone in an inert solvent with 1,3-propanedithiol in solution in an aliphatic monohydric alcohol containing an alkali metal dissolved therein, and isolating from the reaction mixture 7-keto-1,5-dithiacyclooctane.
13. Process for preparing keto-substituted dithiacycloparaffins which comprises mixing and reacting at a temperature below 50° C., a dihaloketone dissolved in an inert solvent with an alkali metal salt of a dithiol dissolved in a solvent selected from the class consisting of water and aliphatic monohydric alcohols, said dihaloketone having the two halogens separated from each other by an acyclic chain of 3 to 5 carbon atoms including the keto carbon atom and said dithiol having the two sulfur atoms separated by a chain of 2 to 4 carbon atoms, the sum of the carbon atoms in the chains separating said halogen atoms and said sulfur atoms being not more than seven, and separating from said reaction mixture a keto-substituted dithiacycloparaffin having from 7 to 9 members in the ring.
14. Process for preparing keto-substituted dithiacycloparaffins which comprises mixing and reacting, at a temperature below 50° C., an alpha,alpha'-dihaloketone dissolved in an inert solvent with a dithiol having the two sulfur atoms separated by a chain of 2 to 4 carbon atoms and in solution in an aliphatic monohydric alcohol containing an alkali metal dissolved therein, and separating from said reaction mixture a keto-substituted dithiacycloparaffin having from 7 to 9 members in the ring.
15. Process as set forth in claim 14 wherein said alpha,alpha'-dihaloketone has a hydrocarbon radical attached to at least one of the carbon atoms adjacent to the keto carbon atom.
16. Process as set forth in claim 14 wherein said dithiol has a hydrocarbon radical attached to at least one of the chain carbons separating said sulfur atoms.
17. Process as set forth in claim 14 wherein said dithiol has the two sulfur atoms separated by a chain of two carbon atoms.
18. Process as set forth in claim 14 wherein said dithiol has the two sulfur atoms separated by a chain of three carbon atoms.
19. Process as set forth in claim 14 wherein said dithiol has the two sulfur atoms separated by a chain of four carbon atoms.
20. Process for preparing 6-keto-1,4-dithiacycloheptane which comprises mixing and reacting, at a temperature below 50° C., sym.-dichloroacetone in an inert solvent with 1,2-ethanedithiol in solution in an aliphatic monohydric alcohol containing an alkali metal dissolved therein, and isolating from the reaction mixture 6-keto-1,4-dithiacycloheptane.

References Cited in the file of this patent

UNITED STATES PATENTS

| | | |
|---|---|---|
| 2,706,158 | Searle | Apr. 12, 1955 |
| 2,752,249 | Latham | June 26, 1956 |
| 2,755,288 | Bullock | July 17, 1956 |
| 2,790,811 | Howard | Apr. 30, 1957 |

FOREIGN PATENTS

| | | |
|---|---|---|
| 25,246 of 1911 | Great Britain | July 4, 1912 |

OTHER REFERENCES

Schotte: Arkiv. Kemi, vol. 5, pp. 533–542 (1953) (C.A. 48:9321g).

Richter: Richter's Organic Chemistry, vol. IV, pp. 4 and 5, Elsevier Publishing Co. Inc., New York (1947).

UNITED STATES PATENT OFFICE
CERTIFICATION OF CORRECTION

Patent No. 2,965,650                                                                  December 20, 1960

Edward G. Howard, Jr.

It is hereby certified that error appears in the above numbered patent requiring correction and that the said Letters Patent should read as corrected below.

Column 5, line 5, after "S," insert -- 29.10; --; line 6, after "M.W., 220" insert -- Found: C, 48.85; H, 7.36; S, 29.09; M.W., 220 --; line 68, for "on" read -- one --; column 6, line 37, for "gorups" read -- groups --; column 9, line 1, for "monohydroxylalkyl" read -- monohydroxyalkyl --.

Signed and sealed this 20th day of June 1961.

(SEAL)
Attest:

ERNEST W. SWIDER                                                       DAVID L. LADD
Attesting Officer                                                               Commissioner of Patents